(No Model.)
P. ROONEY.
STRADDLE ROW CULTIVATOR.
No. 270,251. Patented Jan. 9, 1883.
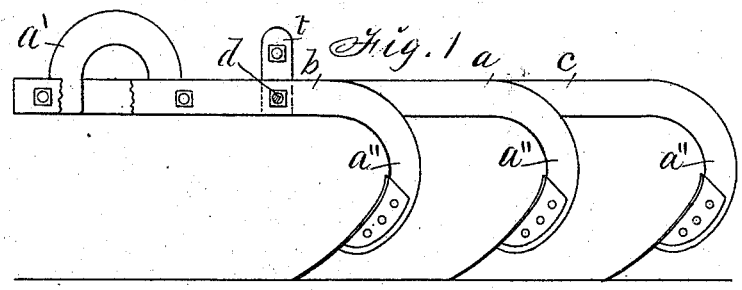
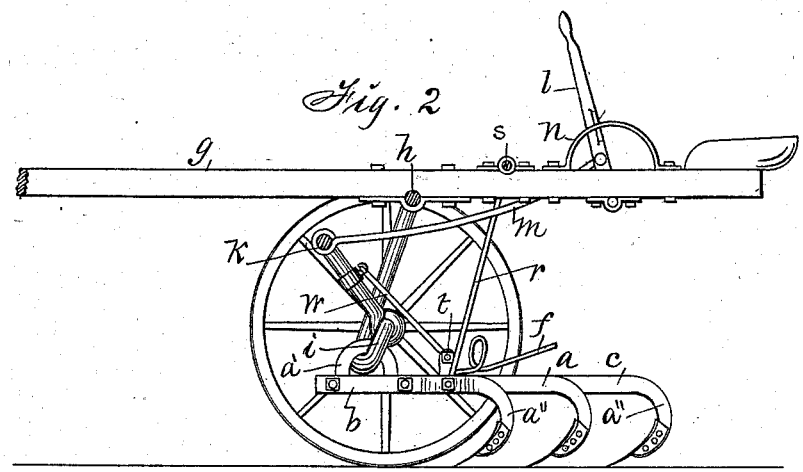
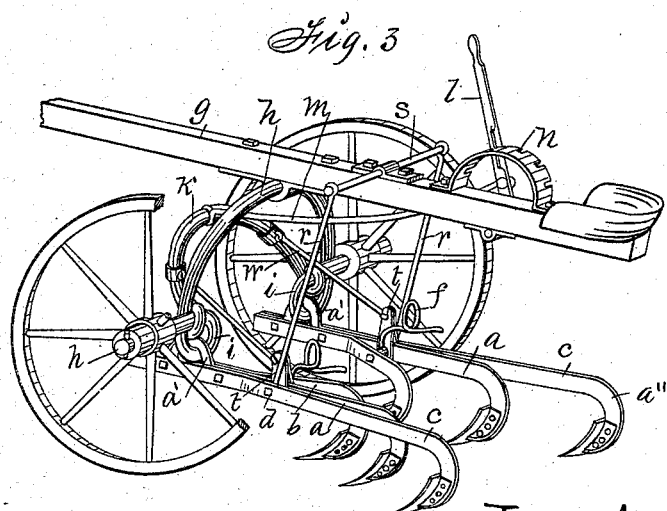
Witnesses:
E. W. Smith
H. A. Stoltenberg
Inventor:
Pattrick Rooney
By Thomas G. Orwig, Attorney.

UNITED STATES PATENT OFFICE.

PATTRICK ROONEY, OF CHARITON, IOWA.

STRADDLE-ROW CULTIVATOR.

SPECIFICATION forming part of Letters Patent No. 270,251, dated January 9, 1883.

Application filed July 6, 1882. (No model.)

*To all whom it may concern:*

Be it known that I, PATTRICK ROONEY, of Chariton, in the county of Lucas and State of Iowa, have invented an Improved Straddle-Row Cultivator, of which the following is a specification.

My invention consists in forming and combining cultivator-frames direct with a carriage in such a manner that they will have vertical and also lateral play, and readily adjusted and directed relative to plants in rows by means of the driver's feet in stirrups, and also readily raised and lowered by means of a hand-lever within reach of the driver when seated on the rear end of a carriage body and pole formed integral with each other, all as hereinafter fully set forth.

Figure 1 of the accompanying drawings is a side view of my cultivator-frame. Fig. 2 is a sectional view, and Fig. 3 a perspective view, of my complete machine. Jointly considered, these figures clearly illustrate the construction and operation of my complete invention.

*a* is the center bar of my cultivator-frame. It has an upward bend, *a'*, at its front end to form an eye, that adapts the complete frame to be flexibly connected with the carriage. Its rear end is bent downward to form a standard or shank, *a''*, adapted to carry a cultivator-shovel. *b* is a second bar, and *c* a third bar, both of which are detachably secured to the front end of the bar *a* by means of screw-bolts. Each of these bars *b* and *c* has a shank, *a'''*, at its rear end to carry a tooth or shovel. They vary in length, as shown, and as required to bring the shovels of the complete straddle-row cultivator into a V-shaped line. The three bars are combined by means of a screw-bolt, *d*, and intervening stay-blocks in such a manner that they will be spread apart at their rear ends and adjustably connected in such a manner that they can be readily expanded or contracted relative to each other, as required to suit the varying widths between the rows of corn and other plants between which the frame and cultivator are to be operated.

*f f* represent my foot-rests or stirrups, flexibly connected with the frames *a b c d*. They may be made of round bar-iron by simply bending short pieces into suitable shape and then linking them to the bolt *d*, as clearly shown in Fig. 1. In the practical use thereof the driver, seated on the rear end of the carriage, places his feet in the stirrups, and by the movements of his feet he can then readily govern the advancing cultivators relative to the line of advance, and also relative to the plants, obstructions, and depth of soil to be stirred.

*g* is a single straight piece of wood, that serves as a carriage-body, and also as a pole for attaching horses and moving and governing the carriage.

*h* is my carriage-axle, formed complete in one piece by simply bending a straight round bar of iron into form as shown, and as required to produce a bowed axle.

*i i* are eyes formed at the base of the bow, for the purpose of flexibly connecting the front ends of the beams of the cultivator-frames *a b c* therewith. The top and center of the bow and axle are rigidly connected with the central portion of the carriage-body and pole *g* by means of clamping-bolts, or in any suitable way.

*k* is a semicircular yoke, that has its ends hinged to the eyes *i* of the bowed axle in such a position that it can be readily vibrated under and within the bow of the axle.

*l* is an elbow-shaped lever, pivoted to the rear portion of the carriage-body *g*.

*m* is a rod connecting the short arm of the lever *l* with the top and center of the yoke *k*.

*n* is a rack fixed to the body *g* in such a position relative to the lever *l* that a flange on the edge of the lever will readily engage the rack as required to retain the lever and the yoke stationary at various angles relative to the carriage and ground.

*r r* represent hangers, that are readily made by simply doubling a rod and forming hooks on its ends adapted to engage the bolts *d* that connect the central portions of the bars *a b c*.

*s s* represents a cross bar or rod fixed to the carriage-body *g*, to extend horizontally in opposite directions to form supports for the hangers *r*, that are flexibly connected therewith and depend therefrom, to serve as a swinging fulcrum upon which the complete frames *a b c d* are balanced and operated.

*t t* represent posts rigidly fixed to the central portions of the frames *a b c d*.

$w$ $w$ are links or rods that extend from the tops of the posts $t$ to the bow of the yoke $k$. By adjusting the lever in the rack $n$ the yoke $k$ is readily raised or lowered, and by means of the posts $t$ and connecting-bars or rods $w$ flexibly connected with the yoke, the rear end of the suspended cultivators $a\ b\ c\ d$ are lifted up or let down, at the pleasure of the operator, to change the inclination of the cultivator teeth or shovels, and thereby govern their depth in the soil.

I am aware that three curved metal plow-beams of different length have been rigidly connected in a gang-plow by means of braces at their rear ends and a cross-piece and coupling device at their front ends; but my manner of forming a V-shaped cultivator-frame of three graduated bars and adapting it to be flexibly connected with a carriage-axle in such a manner as to allow vertical and also lateral motion without any intervening coupling device is novel and greatly advantageous.

I claim as my invention—

1. In a cultivator-frame, a drag-bar or beam having an upward bend or loop, in combination with one or more beams having straight front ends, substantially as shown and described, for the purposes specified.

2. The cultivator-frames composed of the drag-bar $a$, having at its front end a bend, $a'$, the adjustably-connected bars $b\ c$, and the cross-rod $d$, in combination with the arched axle $h$, having bows $i$, substantially as shown and described.

3. The carriage-frame $g\ h$, the yoke $k$, the lever $l$, the connecting-rods $m$, the hangers $r\ s$, and the suspended cultivators having posts $t$, arranged and combined substantially as shown and described, to operate in the manner set forth, for the purposes specified.

PATTRICK ROONEY.

Witnesses:
W. K. LARIMER,
J. D. HOLMES.